Sept. 2, 1924.    1,506,809
H. F. BICKEL ET AL
AIR BRAKE
Filed Sept. 29, 1923    2 Sheets-Sheet 2
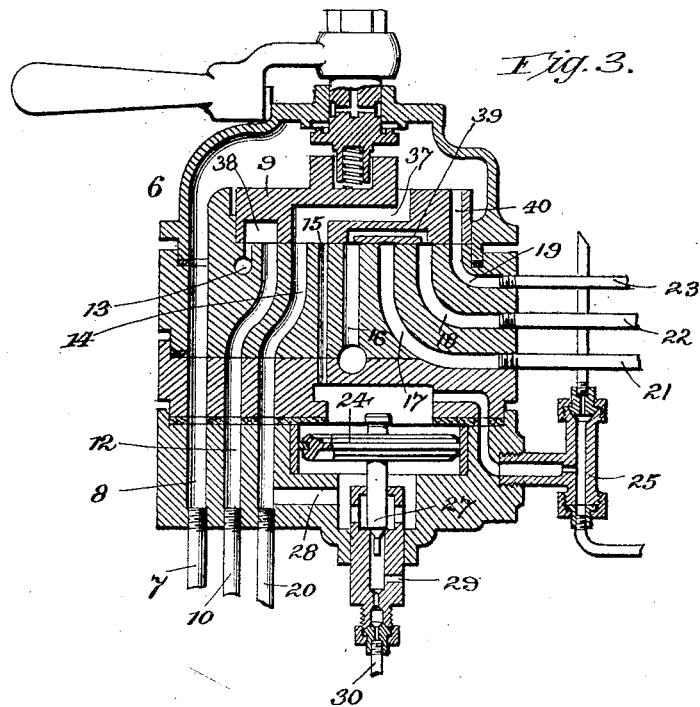
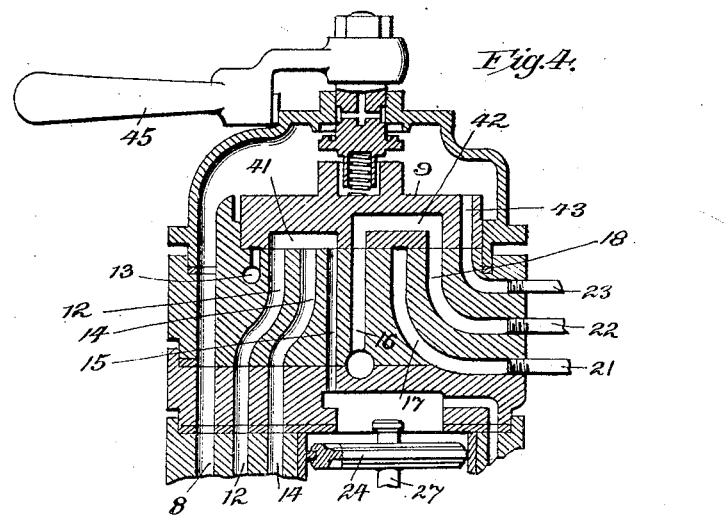

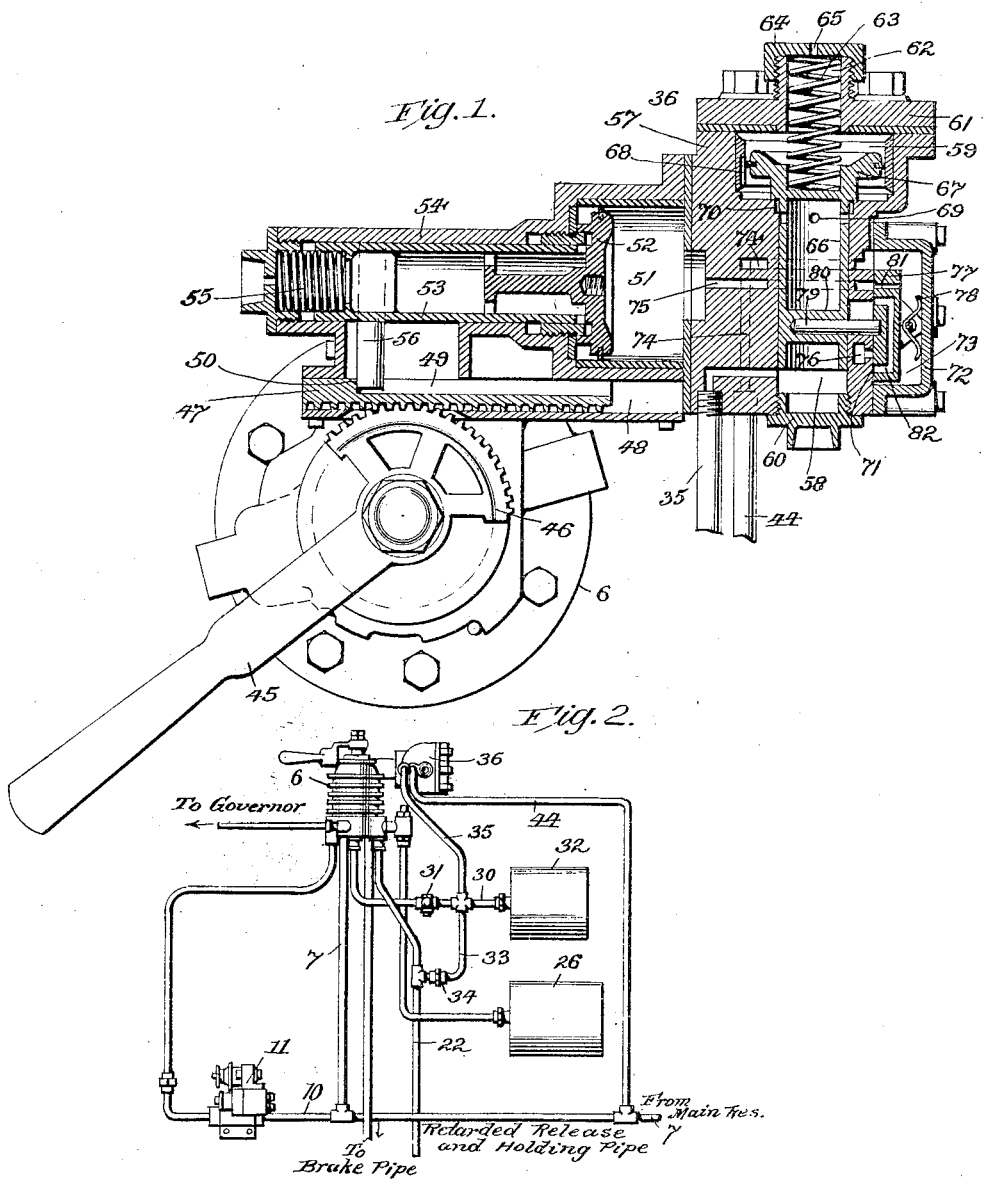

Patented Sept. 2, 1924.

1,506,809

UNITED STATES PATENT OFFICE.

HENRY F. BICKEL, OF PLAINFIELD, NEW JERSEY, AND BLYTHE J. MINNIER, OF WATERTOWN, NEW YORK, ASSIGNORS TO THE NEW YORK AIR BRAKE COMPANY, A CORPORATION OF NEW YORK.

AIR BRAKE.

Application filed September 29, 1923. Serial No. 665,660.

*To all whom it may concern:*

Be it known that we, HENRY F. BICKEL and BLYTHE J. MINNIER, citizens of the United States, residing, respectively, at Plainfield, in the county of Union and State of New Jersey, and at Watertown, in the county of Jefferson and State of New York, have invented certain new and useful Improvements in Air Brakes, of which the following is a specification.

This invention relates to air brakes and particularly to an apparatus for controlling the brake releasing function of automatic air brake equipment of that type which includes auxiliary reservoirs and triple valves.

In our co-pending application, Ser. No. 573,326, filed July 7, 1922, we describe and claim a method of controlling the release of automatic air brakes, and as an incident to such description we disclose the apparatus forming the subject matter of the present application. The present case is subordinate to the pending earlier filed application above identified and is confined to an apparatus operating according to said method.

In air brake systems it is the practice to carry the main reservoir pressure higher than the brake pipe pressure so as to have a reserve of compressed air to insure prompt movement of the triple valves from application or lap positions to release-and-recharge position.

The engineer's brake valve is so constructed as to feed air to the brake pipe from the main reservoir without pressure reduction when the engineer's brake valve is in release position and with pressure reduction when the engineer's brake valve is in running position. The latter position of the engineer's brake valve maintains the desired differential of pressure between the main reservoir and the brake pipe. Release position is used only to initiate release. When the brakes have been applied the engineer moves the brake valve to release position and leaves it there long enough to insure the movement of all the triple valves to release-and-recharge position after which he shifts the engineer's brake valve to running position.

No means is afforded for indicating when all the triple valves have responded, so the engineer must estimate the time necessary to perform this function. Since trains vary in length and since brake applications vary in intensity, the manipulation is seldom precise and commonly is so faulty as to result in reapplication of the brakes on the forward part of the train when the engineer shifts to running position. This reapplication is caused by leaving the engineer's brake valve in release position too long, so that the auxiliary reservoirs on the forward part of the train are overcharged and hence the triple valves shift to application position when the normal brake pipe pressure is established.

The present invention provides a device which automatically shifts the engineer's brake valve to running position at the proper time.

The fundamental principle underlying its operation is automatic limitation of the release function in accordance with the amount of air previously discharged from the brake pipe to effect the application being released. The amount of air discharged when making an application is a function of and, in fact, is approximately proportional to the length of the train (i. e. to the brake pipe volume) and also to the intensity of the application, (i. e. to the brake pipe pressure reduction). The device forming the subject matter of this application measures the quantity of discharged air from the brake pipe to effect an application and imposes a time limit on the ensuing release function which is roughly proportional to such quantity.

The device operates through a pressure motor to shift the engineer's valve from release to running position without imposing any other limitation on the control of this valve by the engineer.

Generally stated, the air vented through the equalizing discharge valve, or some proportional part of such air, is trapped in a reservoir, called the brake pipe discharge reservoir, during the brake applying function of the engineer's brake valve. When pressure exists in the reservoir it acts on a motor connected with the rotary valve of the engineer's brake valve and so affects such motor as to permit the rotary valve to be moved to release position by the engineer. In such release position, however, the air is vented from the brake pipe discharge reservoir at a restricted rate and the resulting fall of pressure in such reservoir so affects the motor as to cause it to move the rotary valve to running position. The duration of venting and hence of full release depends upon the quantity of air trapped in the brake pipe discharge reservoir during application, and hence is approximately proportional to the length of the train and the intensity of the application being released.

In the drawings:

Fig. 1 is a plan view showing partly in section the engineer's brake valve and its associated motor in running position;

Fig. 2 is a diagram of the main piping connections;

Fig. 3 is a sectional port diagram of the engineer's brake valve in release position; and Fig. 4 is a similar diagram showing running position.

The engineer's brake valve is indicated generally by the numeral 6 and, except that it is provided with certain additional ports hereinafter described, conforms to standard practice in its internal construction. The valve selected for illustration is of the type designed for use with the New York Air Brake Company LT equipment, and has six positions known as "release", "running", "holding", "lap", "service", and "emergency", the functions of the valve in such position being slightly changed from standard practice by the special ports so that release position gives retarded release of the locomotive brakes and running position gives full release of the engine brakes.

The feed pipe 7 from the main reservoir (not shown) leads directly to the main air port 8 of the brake valve which conducts air to the space above the rotary valve 9. A feed connection 10 leads through the usual feed valve 11 to the feed port 12 on the valve seat for the rotary valve. This seat also has a warning port 13, brake pipe port 14, equalizing cylinder port 15, exhaust port 16, control reservoir port 17, holding port 18, and pump governor port 19.

The brake pipe port 14 is connected to the brake pipe 20. The control reservoir port 17 is connected to the control reservoir of the LT valve (not shown) by the pipe 21. The holding port 18 is connected as usual to the holding pipe 22 leading to the LT valve. The governor port 19 is connected to the pump governor pipe 23 in the usual manner.

The equalizing cylinder port 15 connects with the space above the equalizing piston 24, which space is enlarged, as is customary, by connection (through fitting 25) with the equalizing reservoir 26. The equalizing valve 27 is actuated by the piston 24 and controls flow through a port 28 leading to atmosphere from brake pipe port 14.

Such discharge to atmosphere is restricted at 29, and from a point between valve 27 and restriction 29 a connection 30 leads through check valve 31 to brake pipe discharge reservoir 32.

From a point between check valve 31 and reservoir 32 a branch 33 leads through a choke or construction 34 to the holding pipe 22, so that the reservoir 32 may be slowly vented into and through the pipe 22 when the latter is connected to atmosphere. From a similar point another branch 35 leads to the motor generally indicated at 36.

In release position certain ports formed in rotary valve 9 function as shown in Fig. 3. Port 37 connects the space above the valve 9 with brake pipe port 14, thus admitting main reservoir air to the brake pipe. Recess 38 connects feed port 12 with warning port 13. Restricted port 39 connects holding port 18 with exhaust port 16 giving retarded release of the locomotive brakes and permitting slow venting of reservoir 32 through choke 34. Port 40 connects the space above the rotary valve with the governor to start the pump.

In running position certain other ports in valve 9 function as shown in Fig. 4. Recess 41 connects feed port 12 with brake pipe port 14 and equalizing cylinder port 15 to feed air at reduced pressure to the brake pipe. Port 42 connects holding port 18 with exhaust port 16 giving quick release of the locomotive brakes. Port 43 connects the space above valve 9 with the governor port to control the pump.

The rotary valve 9 is actuated, as usual, by a handle 45, which has a sector gear 46, and this gear meshes with a rack 47 slidable longitudinally in a guideway 48. The rack 47 is provided with a longitudinal slot 49 having at its left hand end (with reference to Fig. 1) a shoulder or stop 50.

Forming a part of the motor 36 is a cylinder 51 containing a piston 52. This piston is partly guided by, and abuts against the end of a sleeve 53, which is longitudinally slidable in a guideway 54 forming a part of the motor. The sleeve 53 is urged to the right (with reference to Fig. 1) by a spring 55 and is provided with a pin 56 which runs in the slot 49 and under certain circumstances abuts against the stop shoulder 50 to move the rack 47 and thus shift the valve handle 45 through its connected sector gear 46.

When the piston 52 is at its right hand limit of motion, the spring 55 shifts the sleeve 53 so that the pin 56 is moved to the right. With the parts in this position, the pin 56 permits the rack 47 to move far enough to the right to permit the engineer to move the brake valve handle 45 to release position. When the sleeve 53 is in its extreme left hand position, as shown in Fig. 1, the handle 45 cannot be moved to release position, but is arrested by the stop 50 in running position. Obviously, if the valve handle 45 is placed in release position and thereafter sufficient pressure is admitted to act against the right-hand face of piston 52, the movement of the piston 52 to the left will shift the valve handle 45 from release to running position.

The admission of pressure fluid to act against the right-hand face of the piston 52 and the release of such pressure are controlled by a piston-actuated slide valve mechanism subject to the persistence of pressure in the brake pipe discharge reservoir 32.

Mounted on, and forming a head for, the cylinder 51 is a casting 57 provided with a relatively small cylinder 58 and a large coaxial cylinder 59 communicating therewith. The end of the cylinder 58 is closed by a screw plug 60, and the end of the cylinder 59 is closed by a cap 61. This cap 61 is provided with a cylindrical spring seat 62. A coil spring 63 is mounted in the cylindrical seat 62, and bears against a removable cap 64 provided with an air vent 65. The cylinders 58 and 59 receive a differential piston 66 which works consisting of a sleeve piston 66 which works in the cylinder 58, and a piston 67, which works in the cylinder 59 and is directly engaged by the spring 63.

For purposes of explanation, the directions of movement of the pistons 66, 67 will be defined by the terms "upward" and "downward" (with reference to Fig. 1).

The spring 63 urges the differential piston 66, 67 downward, and in this position a groove port 68, formed in the walls of cylinder 59, equalizes the pressures on the opposite sides of the piston head 67. Since the space at the upper side of the piston head 67 is vented to atmosphere through the port 65, the effect of opening the groove port 68 is to establish atmospheric pressure in the annular space below the piston head 67. The piston 66 is formed with a tubular body which establishes communication from the space below the piston to the ports 69. In the lowest position of the differential piston 66, 67, these ports are closed, but, in a slightly higher position of the differential piston, they communicate with an annular groove port 70, and in conjunction with it, establish a connection from the space below the piston 66 to the annular space below the piston 67. The branch pipe 35, which leads from the brake pipe discharge reservoir 32, is connected to the space below the piston 66.

Formed on the casting 57 is a seat 71 for a slide valve. This is housed by a cap 72 forming a pressure chamber 73 to which main reservoir air entering through the pipe 44 is conducted by a port 74. The valve seat 71 is formed with a port 75 leading to the cylinder 51 and with an exhaust port 76, leading to atmosphere. A slide valve 77 is mounted on the seat 71 and is held to its seat by a leaf spring 78. This valve is connected by a pin 79 with the piston 76.

The pin 79 is seated in a web 80 extending across, but not closing the bore of the tubular piston 66, there being, as heretofore explained, a space for the free passage of air through the bore of the piston 66 around the web 80 to ports 69.

The slide valve 77 is provided with an admission port 81, which, in the lower position of the valve 77, connects the pressure space 73 with the port 75 and hence with the cylinder 51. The valve 77 is further provided with an exhaust port 82, which, in the upper position of the valve 77, connects the port 75 and hence the cylinder 51 with the exhaust port 76.

The operation of the device is as follows: Assume that the train is running with the brakes released and that the engineer makes a service application in the usual manner. This involves the release of air through the equalizing discharge valve. A portion of this air, throttled by the restriction at 29 passes the check valve 31 and is confined in the brake pipe discharge reservoir 32. Since this reservoir is connected by pipe 35 to the lower end of cylinder 58, the pressure acting against the lower side of piston 66 will gradually rise as the reservoir is charged. The effect of this pressure is gradually to overpower spring 63 so that the differential piston 66, 67 moves upward. Before it has moved far enough to change the relation of the ports of the valve 77, the piston 67 will overtravel the groove port 68, and the ports 69 will reach the annular port 70.

The effect of the closing of the port 68 and the opening of the ports 69 is to admit the brake pipe discharge reservoir pressure against the annular lower face of the piston 67, greatly increasing the effective area against which this pressure acts, and consequently causing the sudden movement of the differential piston 66, 67 to its extreme upward position. This movement shifts the valve 77 so that the supply of pressure fluid to cylinder 51 is cut off and the cylinder 51 is exhausted to atmosphere through ports 82 and 76.

The spring 55 then moves the sleeve 53 and with it the piston 52 to their right-hand positions. This moves the pin 56 far enough to permit the valve handle 45 to be moved to release position. The parts remain in the positions just described until after the engineer has commenced to release the brakes.

To release the brakes the engineer moves the valve handle 45 to release position. (See Fig. 3). In this position, main reservoir air flows freely to the brake pipe through port 37, and at the same time the port 39 effects a retarded release of the locomotive and tender brakes, accompanied by a slow discharge of air from brake pipe discharge reservoir 32 through choke 34, pipe 22, ports 18 and 37 to exhaust port 16.

As the brake pipe discharge reservoir pressure falls, a point will be reached at which the spring 63 begins to move differential piston 66, 67 downward. A slight movement of the differential piston opens port 68 and closes ports 69, causing a sudden reduction in the effective area against which the brake pipe discharge reservoir pressure acts, so that spring 63 completes the downward movement of the differential piston quickly. In the lower position of the differential piston valve 77 cuts off the exhaust connection from port 75 and establishes a main reservoir pressure connection from the space 73 through ports 81 and 75 to cylinder 51. This shifts piston 52 to its left-hand position, and shifts handle 45, and hence valve 9, to running position through the action of pin 56, shoulder 50, rack 47, and sector gear 46.

Running position is shown in Fig. 4 and leads to recharge of the brake pipe through the feed valve 11 and ports 12, 41 and 14. The port 42 gives quick release of the locomotive and tender brakes.

The sizes of ports 39 and 42 control the rates of release of the locomotive and tender brakes. The choke 34 controls the rate of discharge of air from reservoir 32. Hence ports 39 and 42 may be made any desired size without materially affecting release control. The described arrangement is preferred because release position only slowly releases the locomotive and tender brakes and the engineer can retain a part of the application by shifting to holding position.

What is claimed is:

1. The combination with an automatic air brake system including a main reservoir, a brake pipe, a pressure reducing feed valve and an engineer's valve, the engineer's valve having an application position in which it discharges air from the brake pipe, a release position in which it feeds main reservoir air directly to the brake pipe and a running position in which it feeds main reservoir through said feed valve to the brake pipe, of a motor constructed and arranged to shift said engineer's valve from release to running position; and a controlling mechanism for said motor conditioned by the release of air from the brake pipe in the application function of the engineer's valve, in varying degree according to the quantity of air so released, said mechanism being rendered operative by the engineer's valve in release position and serving to actuate said motor after a time interval corresponding to said quantity condition.

2. The combination with an automatic air brake system including a main reservoir, a brake pipe, a pressure reducing feed valve, and an engineer's valve, the engineer's valve having an application position in which it discharges air from the brake pipe, a release position in which it feeds main reservoir air directly to the brake pipe, and a running position in which it feeds main reservoir air through said feed valve to the brake pipe, of a pressure motor constructed and arranged to shift said engineer's valve from release to running position; and a variably delayed-action controlling valve for said motor, arranged to be variably conditioned as to the delay period according to the quantity of air released from the train pipe in the application function of the engineer's valve, and permitted to act by the movement of the engineer's valve to release position.

3. The combination with an automatic air brake system including a main reservoir, a brake pipe, a pressure reducing valve, and an engineer's valve, the engineer's valve having an application position in which it discharges air from the brake pipe, a release position in which it feeds main reservoir air directly to the brake pipe, and a running position in which it feeds main reservoir air through said feed valve to the brake pipe, of a motor constructed and arranged to shift said engineer's valve from release to running position; pressure operated means for rendering said motor inactive; means serving to accumulate from the air discharged from the engineer's valve during its application function confined pressure fluid acting on said pressure operated means; and means serving in the release position of the engineer's valve to release gradualy the pressure fluid so accumulated.

4. The combination with an automatic air brake system including a main reservoir, a brake pipe, a pressure reducing feed valve, and an engineer's valve of the equalizing discharge type and having an application position in which it discharges air from the brake pipe through an equalizing discharge valve, a release position in which it feeds main reservoir air directly to the brake pipe and a running position in which it feeds main reservoir air through said feed valve to the brake pipe, of means for restricting the discharge flow beyond said equalizing discharge valve; a brake pipe discharge reservoir connected to be charged under pressure by discharging air confined by said restriction; means operative in release position of the engineer's valve to vent said brake pipe discharge reservoir gradually; a motor constructed and arranged to shift said engineer's valve from release to running position; and controlling means for said motor, subject to pressure in said brake pipe discharge reservoir, and serving when under pressure to render said motor inactive.

5. The combination with an automatic air brake system including a main reservoir, a brake pipe, a pressure reducing feed valve, and an engineer's valve of the equalizing discharge type and having an application position in which it discharges air from the brake pipe through an equalizing discharge valve, a release position in which it feeds main reservoir directly to the brake pipe, and a running position in which it feeds main reservoir air through said feed valve to the brake pipe, of means for restricting the discharge flow beyond said equalizing discharge valve; a brake pipe discharge reservoir connected to be charged under pressure by discharging air confined by said restriction; means comprising a restricted exhaust port in the engineer's valve, open in the release position of said valve and serving to vent said brake pipe discharge reservoir; a motor constructed and arranged to shift said engineer's valve from release to running position; and controlling means for said motor, subject to pressure in said brake pipe discharge reservoir, and serving when under pressure to render said motor inactive.

In testimony whereof we have signed our names to this specification.

HENRY F. BICKEL.
BLYTHE J. MINNIER.